UNITED STATES PATENT OFFICE.

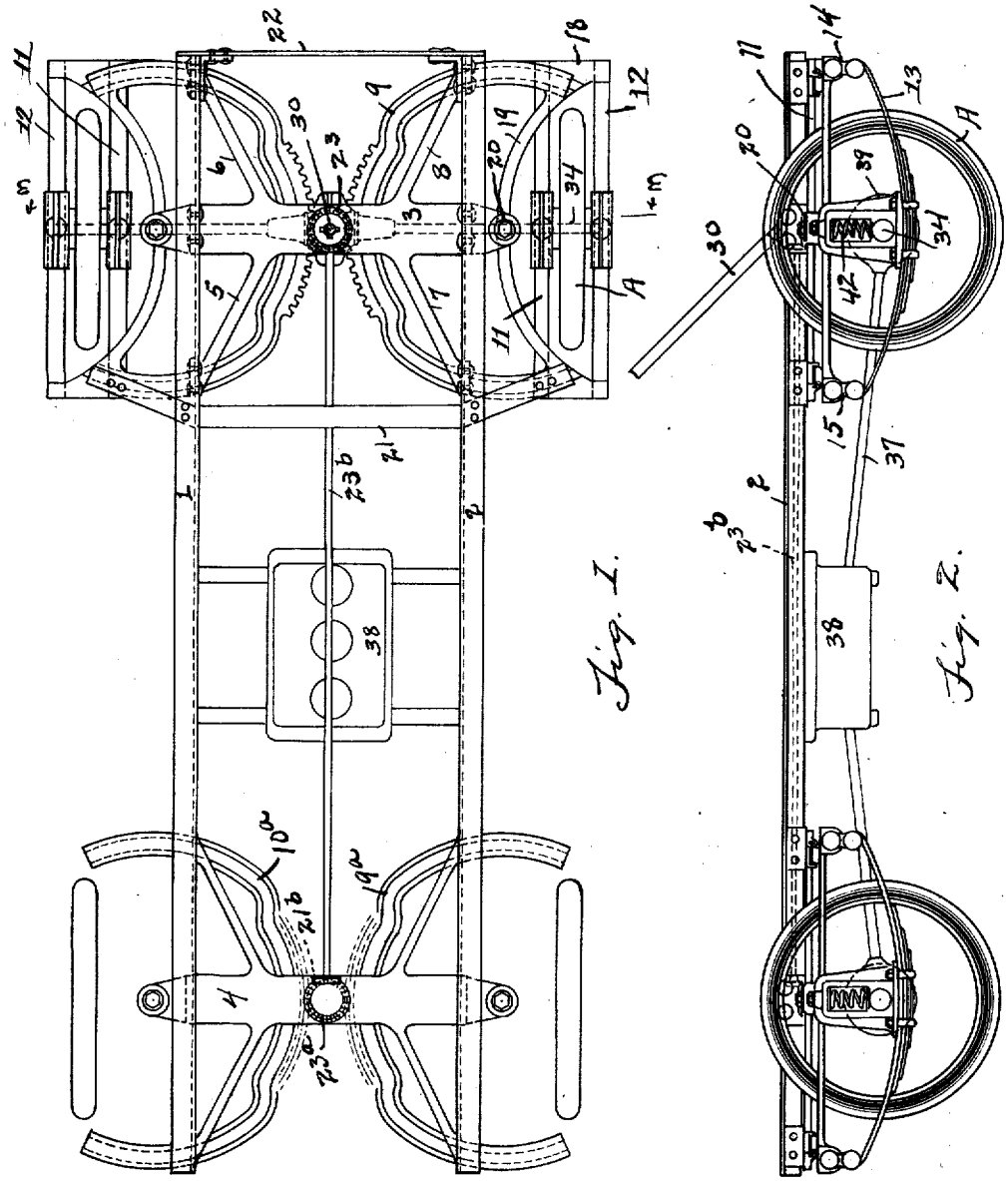

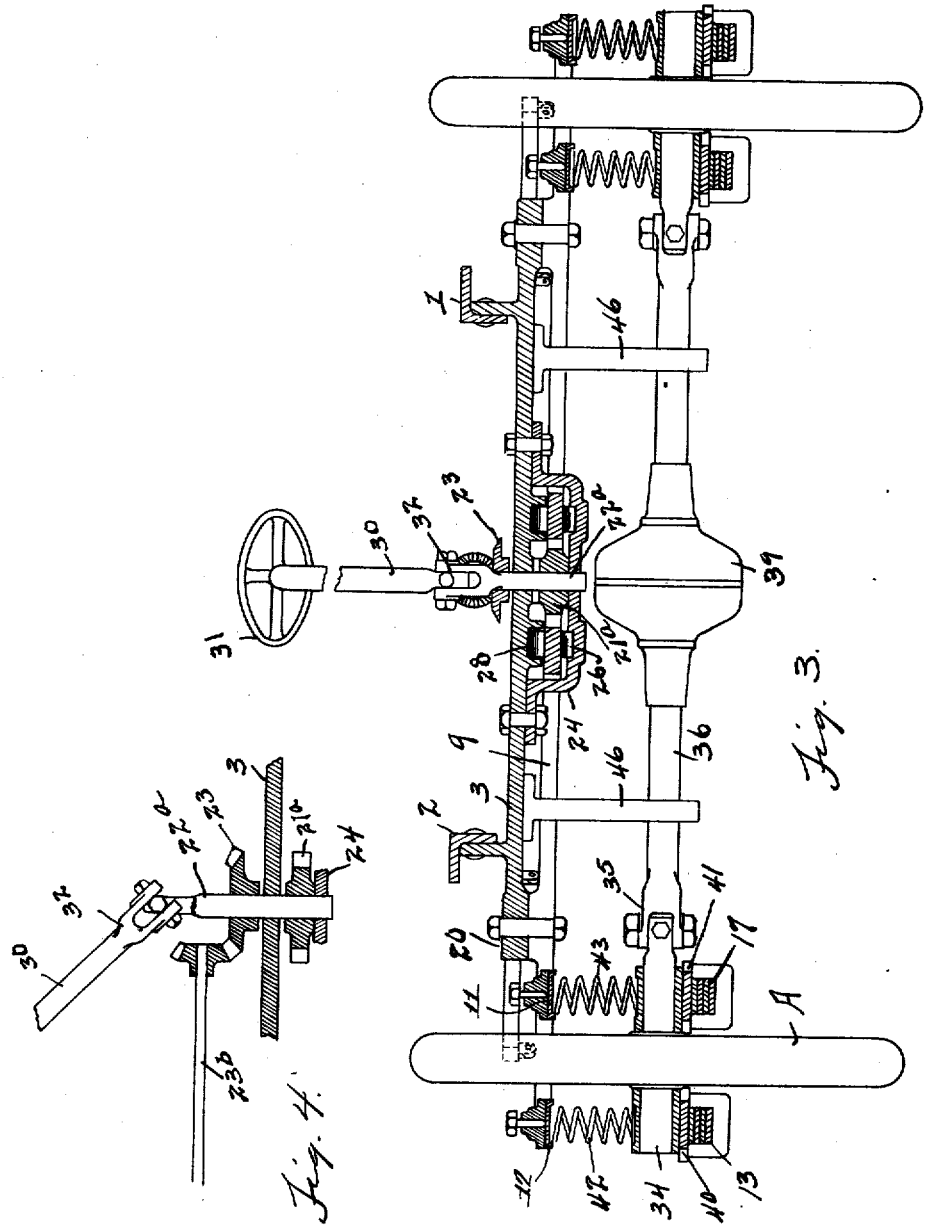

JESSE H. HAND, OF ANN ARBOR, MICHIGAN.

VEHICLE-FRAME.

1,010,138.     Specification of Letters Patent.     Patented Nov. 28, 1911.

Application filed March 31, 1910. Serial No. 552,545.

*To all whom it may concern:*

Be it known that I, JESSE H. HAND, citizen of the United States, residing at Ann Arbor, county of Washtenaw, State of Michigan, have invented a certain new and useful Improvement in Vehicle-Frames, and declare the following to be a full, clear, and exact description of the same, such as will enable others skilled in the art to which it pertains to make and use the same, reference being had to the accompanying drawings, which form a part of this specification.

This invention relates to vehicle frames. It has for its object an improved construction of frame for automobile trucks.

In the truck in which the invention is embodied there is a rigidly built rectangular frame carried by spring supports on four independent sub-frames, one for each wheel; of the four independent frames, the two which are at the front are each pivotally connected to the main frame, and the short axle of each wheel is connected by a universal joint with a live axle that crosses the main frame; the two wheels at the front remain parallel to each other, but may swing to an angular relation to the transverse axle. The vertical axis of the pivot which connects the sub-frame to the main frame, and the vertical axis of the universal joint connection between the wheel and the main axle are in alinement. Each of the four wheels is on a short axle, which is supported, at both sides of the wheel, in the bearings of the sub-frame; the wheel and sub-frame oscillate together in the operation of steering; the two rear wheels oscillate in the same manner as the front wheels, but in the reverse direction. To provide for a slight yielding movement of the transverse axle with reference to the main frame, the transverse axles are free from the main frame, except that they are arranged between hangers which prevent oscillation of the transverse axle in a horizontal plane, and allow a slight oscillation in a vertical plane transversely of the frame.

Figure 1, is a plan view of the vehicle frame. Fig. 2, is a side elevation. Fig. 3, is a cross-section through the main part of the frame and an elevation of the axle and wheels. It may be considered as taken at the line 3—3 of Fig. 1, but inasmuch as the front and rear part of the vehicle frame are exceedingly similar, it would show the same parts in connection with the rear axle. The only distinction between the front and rear axles in construction is that one contains the parts of the steering gear which are not used with the other. Fig. 4, is a sectional detail of the steering connections.

The side beams 1, 2 of a frame are united by cross-beams 3 and 4 which cross the frame directly above the front and rear axles. Other cross beams and braces 21, 22 may be placed across between the side beams at any place, but their presence or absence is entirely immaterial to the carrying out of the invention, and is material only as to making the frame properly strong. The main cross beam 3 over the front axle is braced to the side beams by braces 5 and 6 on the one side and 7 and 8 on the other (the rear cross beam 4 is similarly braced and tied).

A description of a single one of the sub-frames and its connections to the main frame will enable one to understand the entire truck, and therefore the description will be limited to one of such frames, and to this description will be added a description of the several sub-frames in their connection with the main frame. The sub-frame is made of longitudinal bars 11 and 12 and longitudinal springs 13 and 17. The spring 13 is coupled to the bar 12 by shackles 14 and 15, and the spring 17 is coupled to the bar 11 by similar shackles (not shown in the drawing). The bars 11 and 12 are coupled together by a member 18, which as a single piece connects both ends of the bars 11 and 12. and the two end portions of the single uniting member are themselves connected by an arched yoke 19 that is pivotally connected by means of pivot 20 with the end of the cross beam 3. Integral with the members 18 is an arched member 9, provided with a rack that engages with the pinion 21ᵃ (see Figs. 3 and 4) on a vertical arbor 22ᵃ. The rack is concentric with the pivot 20, and the arbor 22ᵃ is midway between the ends of the cross beam 3, while the pinion 21ᵃ engages with the rack portion of the member 9 as well as with the rack on the member 10, thereby actuating both wheels simultaneously. The two frames coupled to the two ends of the cross member 3 engage the single pinion 21ᵃ on the shaft 22ᵃ and a similar pinion 21ᵇ is engaged by similar arched and racked bearing yokes 9ᵃ and 10ᵃ on the rear axle. The shaft 22ᵃ and its correspondent member on the rear shaft, which is not specifically illustrated, since it is of the same general construction, are each provided with miter pinions which gear to miter gears 23 and 23ª on the end of a long shaft 23ᵇ that extends from the front beam 3 to the rear cross beam 4. The rack yoke 9 is supported by a bearing hanger yoke 24 and travels between anti-friction rolls, of which 26 is beneath it supported by the hanger and 28 is above it supported by the cross member 3. The pinion 21ª is driven for steering purposes by a post 30 provided on its upper end with a hand wheel 31 and coupled to the top of the post 22ª by a universal joint coupling 32.

In each sub-frame are the bearings for the wheels. In the sub-frame which has been referred to for purposes of description, wheel A is provided with a hub through which extends an arbor 34 joined by a universal coupling 35 to the axle 36, which axle itself is driven by a shaft 37 from the engine 38 that connects with ordinary differential gearing (not shown) in the casing 39. The arbor 34 is in fixed relation to the wheel A and rotates in bearings 40 and 41 which are secured to the springs 13 and 17; additional springs 42 and 43 are interposed above the bearings between them and the frame bars 11 and 12.

In this frame construction each wheel is journaled independently on both sides of its hub, in a sub-frame of which in the entire vehicle there are four and these four sub-frames are adapted to be shifted for steering purposes independently, but are coupled in front and rear pairs. The wheel at the front is arranged to be turned in one direction and the wheels at the rear in the other direction, making a very short turning movement and a very short turn as regards ground distance covered during such movement. The wheels supported on both sides are balanced and the double pivotal connection between the sub-frame on the one part and the axle and main frame on the other part make the entire frame very stable. The axle 36 is shackled to prevent its taking a relation of angularity with respect to the long axis of the frame by hangers 46 which allow the necessary vertical oscillation of the axle 36 but prevent horizontal oscillation thereof. Each hanger 46 preferably consists of two parts or branches, one at the front and the other at the rear of the axle with which it engages, and with an opening between them in which the axle can oscillate.

What I claim is:—

1. In combination with a main vehicle frame, a sub-frame for each wheel, pivotally connected with said main frame, said sub-frames being toothed in the center of their horizontally arched portions, traction wheels rotatably journaled in said sub-frames, axles for each pair of wheels, said axles having hinge connections at their ends with the wheels, whereby the rotative movement of the axle may be communicated to the wheels irrespective of their angular position with respect to the axle or to the vehicle body, a pivoted gear wheel mounted between the adjacent toothed portions of each pair of sub-frames, with its teeth in engagement therewith, a lengthwise extending shaft carrying gear wheels in engagement with said pivoted gear wheels, and a steering member operatively connected with said shaft whereby said shaft may be rotated in either direction, thereby actuating said sub-frames and their wheels accordingly, substantially as described.

2. In a frame for vehicles, in combination with a rigid frame body, wheel axles rotatably supported therebeneath, independent sub-frames pivotally secured to the frame body, traction wheels rotatably journaled therein, said wheels being connected with the adjacent ends of the wheel axles whereby they may receive rotative actuation therefrom, irrespective of the angular position of the wheels and their supporting sub-frames with reference to the frame body, a longitudinal shaft extending between the adjacent inner ends of the horizontal portions of the sub-frames, and means operatively connecting said shaft and said sub-frames whereby when the shaft is rotatively actuated in either direction its movement is communicated to said sub-frames to effect a change in their angularity with respect to the main frame and said shaft, substantially as described.

3. In a vehicle frame, the combination of a rigid frame body, traction wheels therefor, independent sub-frames pivoted to said frame body, wherein said wheels are rotatably journaled, and whereby the frame body is resiliently connected therewith, rotatable axle members having hinge connections at their ends with said traction wheels, whereby the same may be rotatively actuated by the rotation of the axle member with which they are connected, a lengthwise extending rotatable shaft, means operatively connecting said shaft with the adjacent portion of each sub-frame whereby, when the shaft is rotatively actuated, said sub-frames are swung about their points of pivoting to the main frame, and a steering wheel adapted to be manually actuated, whereby said shaft may be rotated in either direction, substantially as described.

In testimony whereof, I sign this specification in the presence of two witnesses.

JESSE H. HAND.

Witnesses:
CHARLES F. BURTON,
VIRGINIA C. SPRATT.